May 15, 1945.　　F. TURRETTINI　　2,376,100
MACHINE TOOL
Filed June 15, 1942　　2 Sheets-Sheet 1

Inventor
F. Turrettini

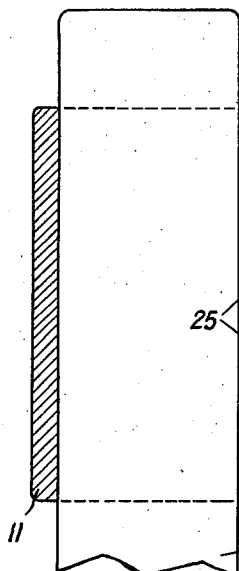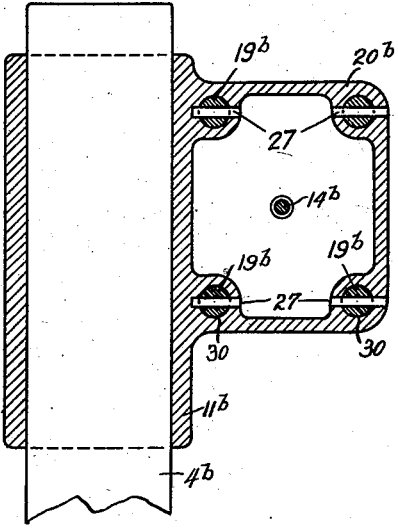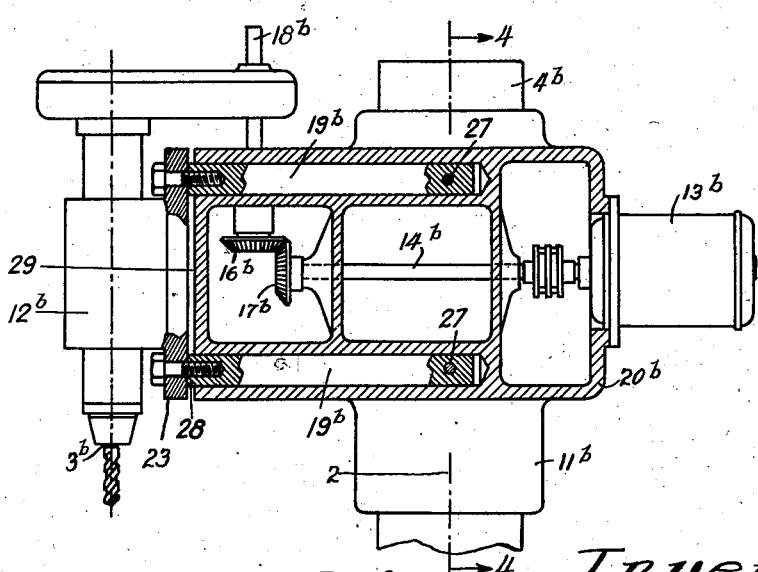

Patented May 15, 1945

2,376,100

UNITED STATES PATENT OFFICE 2,376,100

MACHINE TOOL

Fernand Turrettini, Bellevue-Geneva, Switzerland, assignor to the firm Societe Genevoise d'Instruments de Physique, Geneva, Switzerland Application June 15, 1942, Serial No. 447,196
In Switzerland June 18, 1941

2 Claims. (Cl. 77—5)

This invention relates to improvements in machine tools and the like, and has for its object to provide means for maintaining the working tool in fixed position regardless of the expansion and contraction of the machine frame and related tool supporting parts due to changes in temperature.

In the accompanying drawings wherein several embodiments of the invention are illustrated:

Fig. 2 is a detail vertical sectional view on the line 2—2 of Fig. 1.

Fig. 3 is a fragmentary view similar to Fig. 1 illustrating a second form of the invention.

Fig. 4 is a vertical sectional view on the line 4—4 of Fig. 3.

Figure 1:
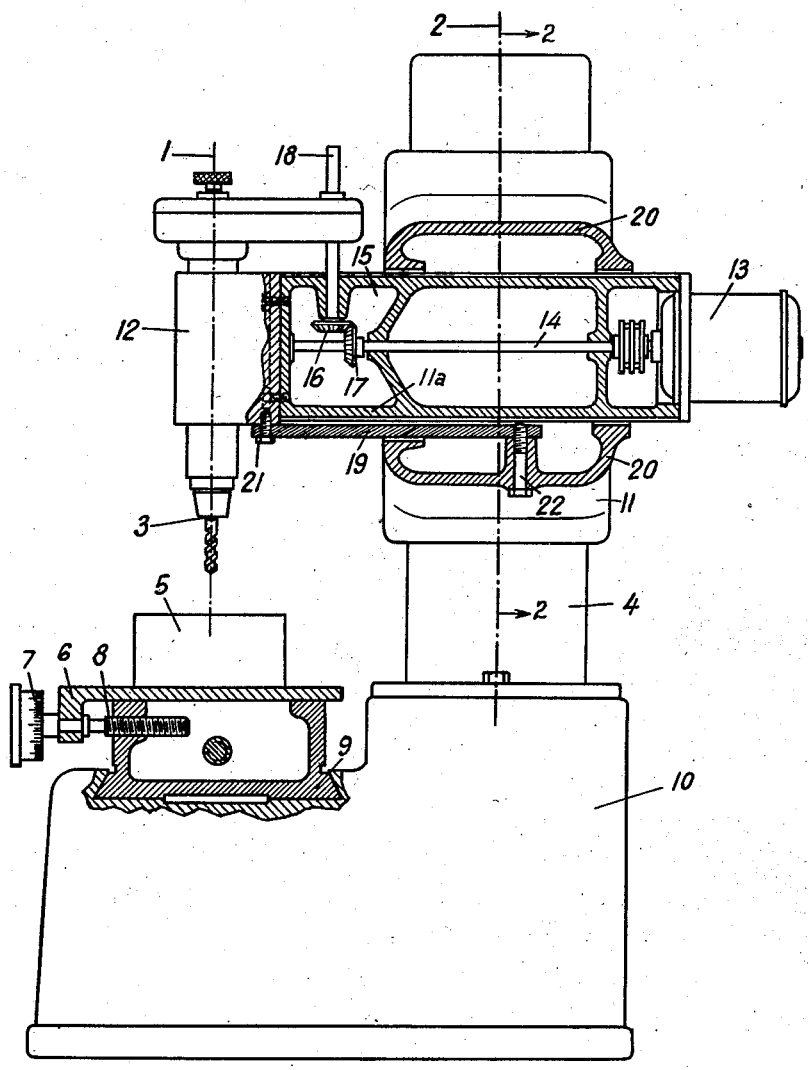
Fig. 1 is a side elevation partly in section of a machine illustrating the invention applied thereto.

Referring to the embodiment of the invention illustrated in Figs. 1 and 2, the numeral 1 indicates the geometrical axis of the tool 3, and the numeral 2 indicates the geometrical axis of an upright 4 mounted on the frame 10 of the machine. 5 represents diagrammatically the work piece mounted on a work holder slide 6, the position of which is accurately determined by a graduated drum 7 fixed to a measuring screw 8. The slide 6 is mounted to move in a direction perpendicular to the screw 8 with a slide 9 adjustable on the frame 10.

A support 11 is mounted on the upright 4 and is provided with a lateral extension 20 formed with horizontal guide surfaces 24, 25 and 26 which are arranged to present a channel-like guideway. Both ends of the guide channel are open and a slide 11a is slidably mounted therein. One side of the guide channel is also open as shown in Fig. 2 and a cover plate 23 is secured thereover to hold the slide 11a in position.

A motor 13 is supported at one end of the slide 11a and a tool head 12 at the opposite end. A transmission gear consisting of shafts 14 and 18 and the gear wheels 16 and 17 is provided whereby motion is transmitted from the motor 13 to the tool 3.

A strip 19 formed of some inexpansible material, such as iron alloy with 36 percent nickel, is secured to extension 20 at a point 22 in proximity to the axis 2. The opposite end of the strip 19 is secured at 21 to the slide 11a in proximity to the axis 1.

By this arrangement the inexpansible quality of the strip 19 serves to maintain the tool 3 in fixed position regardless of expansion and contraction of the machine frame and related tool supporting parts which might be caused by changes in atmospheric temperatures or by heating due to friction of the moving parts of the power transmission, and also of the electric motor 13.

In the modification of the invention illustrated in Figs. 3 and 4, the support 11b is mounted on the upright 4b and is provided with a lateral extension 20b having a plurality of guide channels 30 formed therein.

Strips 19b formed of inexpansible material are mounted in the channels 30 and are secured at one end by anchoring pins 27 arranged substantially in the plane of the axis 2. The opposite ends of the strips 19b project externally beyond the lateral extension 20b and are bolted or otherwise secured to a combined cover and supporting plate 23b to which the tool head 12b is attached. The tool 3b is mounted in the head 12b and is driven by the motor 13b through shafts 14b and 18b and gear wheels 16b and 17b.

The inexpansible strips 19b are of such length as to maintain the plate 23b in spaced relation to the front face 29 of the lateral extension 20b and thus a clearance space 28 is provided to accommodate such relative movement between the extension 20b and plate 23b which may occur as the result of expansion and contraction of the parts and the action of the strips 19b in maintaining the tool 3b in fixed position, regardless of such expansion and contraction.

What is claimed to be new is:

1. In combination, a work holder, a tool holder disposed above the work holder, a support having a guide channel open at one side, a slide movable longitudinally in said channel and carrying said tool holder at one end, a strip-like member of substantially non-expansible material secured at one end to the slide adjacent said tool holder and at the other end to said support, and a removable cover plate extending across the open side of said channel and confining said slide.

2. An arrangement as claimed in claim 1, wherein a drive motor is secured to the end of said slide opposite the tool holder and connected with the tool holder through a power transmission gear.

FERNAND TURRETTINI.